United States Patent
Nakanishi et al.

(10) Patent No.: US 11,417,902 B2
(45) Date of Patent: Aug. 16, 2022

(54) FUEL CELL SYSTEM

(71) Applicant: TOYOTA JIDOSHA KABUSHIKI KAISHA, Toyota (JP)

(72) Inventors: Junji Nakanishi, Kasugai (JP); Tomoo Yoshizumi, Toyota (JP); Koro Fujio, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/221,004

(22) Filed: Apr. 2, 2021

(65) Prior Publication Data

US 2021/0359318 A1 Nov. 18, 2021

(30) Foreign Application Priority Data

May 15, 2020 (JP) .............................. JP2020-086269

(51) Int. Cl.
| | | |
|---|---|---|
| *H01M 8/04664* | (2016.01) | |
| *H01M 8/04537* | (2016.01) | |
| *H01M 8/04858* | (2016.01) | |
| *H01M 8/04089* | (2016.01) | |
| *H01M 8/04119* | (2016.01) | |

(Continued)

(52) U.S. Cl.
CPC ... *H01M 8/04671* (2013.01); *H01M 8/04291* (2013.01); *H01M 8/04544* (2013.01); *H01M 8/04895* (2013.01); *H01M 2250/20* (2013.01)

(58) Field of Classification Search
CPC ......... H01M 8/04671; H01M 8/04291; H01M 8/04544; H01M 8/04895; H01M 2250/20; H01M 8/04097; H01M 8/04179; H01M 8/04679; H01M 8/04753; H01M 8/04559; H01M 8/04228; H01M 8/04303;

(Continued)

(56) References Cited

U.S. PATENT DOCUMENTS

| | | | | |
|---|---|---|---|---|
| 8,092,947 B1 * | 1/2012 | Ishikawa | ........... | H01M 8/04268 |
| | | | | 429/432 |
| 8,658,324 B2 * | 2/2014 | Umayahara | ....... | H01M 8/04574 |
| | | | | 429/442 |

(Continued)

FOREIGN PATENT DOCUMENTS

| | | |
|---|---|---|
| JP | 2012119165 A | 6/2012 |
| JP | 2012191165 A | 6/2012 |

*Primary Examiner* — Christian Roldan
(74) *Attorney, Agent, or Firm* — Dickinson Wright, PLLC

(57) ABSTRACT

A controller of a fuel cell system detects catalytic layer deterioration and drainage malfunction by the following inspection process. The controller may: execute drainage of water from a fuel cell, and acquire first/second output voltages of the fuel cell when an output current density of the fuel cell is a first reference current density A1/A2 (A2>A1). When the first output voltage is lower than a first threshold voltage and the second output voltage is higher than a second threshold voltage, the controller may output a first determination signal indicating that the catalytic layer is deteriorated and the drainage is executed without malfunction. When the first output voltage is higher than the first threshold voltage and the second output voltage is lower than the second threshold voltage, the controller may output a second determination signal indicating that the catalytic layer is not deteriorated and the drainage is executed with malfunction.

7 Claims, 4 Drawing Sheets

(51) Int. Cl.
*H01M 8/04746* (2016.01)
*H01M 8/04291* (2016.01)

(58) Field of Classification Search
CPC ......... H01M 8/04873; H01M 8/04902; H01M 8/04992; Y02E 60/50
USPC ....................................................... 429/432
See application file for complete search history.

(56) References Cited

U.S. PATENT DOCUMENTS

| | | | | |
|---|---|---|---|---|
| 2004/0028970 | A1* | 2/2004 | Sakai | H01M 8/04156 429/444 |
| 2004/0214062 | A1* | 10/2004 | Tajiri | H01M 8/2483 429/492 |
| 2010/0266911 | A1* | 10/2010 | Aso | H01M 8/04559 429/427 |
| 2012/0015261 | A1* | 1/2012 | Han | H01M 8/1007 429/413 |
| 2012/0171582 | A1* | 7/2012 | Yang | H01M 8/04201 429/410 |
| 2014/0335433 | A1* | 11/2014 | Jomori | H01M 8/04559 429/432 |
| 2015/0111122 | A1* | 4/2015 | Matsusue | H01M 8/04559 429/432 |
| 2015/0125772 | A1* | 5/2015 | Matsusue | H01M 8/04873 429/432 |

\* cited by examiner

FIG. 2

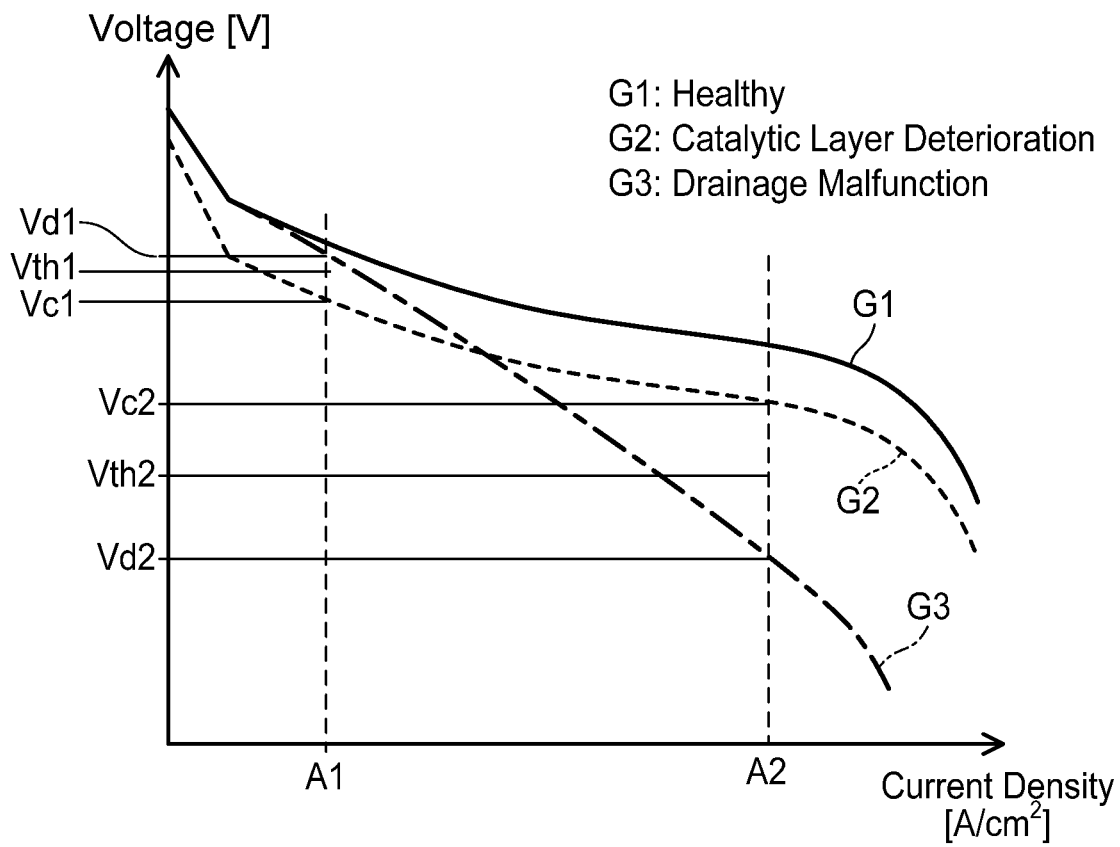

A1: First Reference Current Density
A2: Second Reference Current Density
Vth1: First Threshold Voltage
Vth2: Second Threshold Voltage
Vc1: Voltage of Fuel Cell with Catalytic Layer Deterioration
    (First Reference Voltage Density A1)
Vc2: Voltage of Fuel Cell with Catalytic Layer Deterioration
    (Second Reference Voltage Density A2)
Vd1: Voltage of Fuel Cell with Drainage Malfunction
    (First Reference Voltage Density A1)
Vd2: Voltage of Fuel Cell with Drainage Malfunction
    (Second Reference Voltage Density A2)

FUEL CELL SYSTEM

CROSS-REFERENCE TO RELATED APPLICATION

This application claims priority to Japanese Patent Application No. 2020-086269 filed on May 15, 2020, the contents of which are hereby incorporated by reference into the present application.

TECHNICAL FIELD

The art disclosed herein relates to a fuel cell system. Especially, it relates to a fuel cell system configured to detect both catalytic layer deterioration and drainage malfunction in a fuel cell with a distinction between them.

BACKGROUND

It is known that, in a fuel cell system, an output current density decreases when a catalytic layer deteriorates. Japanese Patent Application Publication No. 2012-119165 describes a fuel cell system that determines that a catalytic layer is deteriorated when an output current density of a fuel cell is lower than an expected current density.

SUMMARY

A cause of an output of a fuel cell being lower than an expected output is not limited to catalytic layer deterioration. For example, the output would decrease also when water is not suitably drained from the fuel cell and thus, water accumulates within the fuel cell. A phenomenon in which water accumulates within the fuel cell may be called flooding. The disclosure herein provides a fuel cell system configured to detect both catalytic layer deterioration and drainage malfunction with a distinction between them.

A fuel cell system disclosed herein may comprise a fuel cell, a current regulator, a voltage sensor, and a controller. The fuel cell may comprise an electrolyte film, a catalytic layer, and a diffusion layer, and the electrolyte film is held between a catalytic layer and a diffusion layer. The current regulator may be connected to the fuel cell and be configured to regulate an output current density of the fuel cell. The voltage sensor may be configured to measure an output voltage of the fuel cell. The controller may store a first threshold voltage that corresponds to a first reference current density and a second threshold voltage that corresponds to a second reference current density, the second reference current density being greater than the first reference current density. Catalytic layer deterioration and drainage malfunction are respectively detected by using the first threshold voltage and the second threshold voltage.

The controller may be configured to detect the catalytic layer deterioration and the drainage malfunction by a following inspection process. The controller executes drainage of water from the fuel cell. Then, the controller controls the output current density of the fuel cell to the first reference current density, and then to the second reference current density by using the current regulator. The controller acquires a voltage of the fuel cell (first output voltage) when the output current density is the first reference current density and a voltage of the fuel cell (second output voltage) when the output current density is the second reference current density. The controller outputs a first determination signal when the first output voltage is lower than the first threshold voltage and the second output voltage is higher than the second threshold voltage, the first determination signal indicating that the catalytic layer is deteriorated and the drainage is executed without malfunction. The controller outputs a second determination signal when the first output voltage is higher than the first threshold voltage and the second output voltage is lower than the second threshold voltage, the second determination signal indicating that the catalytic layer is not deteriorated and the drainage is executed with malfunction. The controller outputs a third determination signal when the first output voltage is lower than the first threshold voltage and the second output voltage is lower than the second threshold voltage, the third determination signal indicating that the catalytic layer is deteriorated and the drainage is executed with malfunction.

The first reference current density may be less than 10% of a maximum output current density of the fuel cell, and the second reference current density may be greater than 40% of the maximum output current density of the fuel cell. A voltage drop that occurs in the fuel cell due to the catalytic layer deterioration is substantially constant regardless of the output current density. On the other hand, a voltage drop that occurs in the fuel cell due to the drainage malfunction is more severe with a greater output current density. Since only a small amount of fuel gas is required when the output current density is small, the water accumulated within the fuel cell does not obstruct a fuel gas flow. When the output current density is large, that is, when the large amount of the fuel gas is required, the fuel gas flow is hindered by the water accumulating within the fuel cell, and the voltage drop is thereby caused.

When the output current density of the fuel cell is less than 10% of the maximum output current density, the voltage drop caused by the catalytic layer deterioration is more prominent than the voltage drop caused by the drainage malfunction. When the output current density exceeds 40% of the maximum output current density, the voltage drop caused by the drainage malfunction is more prominent than the voltage drop caused by the catalytic layer deterioration.

As such, the first threshold voltage and the second threshold voltage may be set as follows. The first threshold voltage may be lower than the output voltage of the fuel cell when the fuel cell in which the drainage is executed with malfunction outputs current having the first reference current density, and higher than the output voltage of the fuel cell when the fuel cell in which the catalytic layer is deteriorated outputs current having the first reference current density. The second threshold voltage may be lower than the output voltage of the fuel cell when the fuel cell in which the catalytic layer is deteriorated outputs current having the second reference current density, and higher than the output voltage of the fuel cell when the fuel cell in which the drainage is executed with malfunction outputs current having the second reference current density. By setting as above, the catalytic layer deterioration can be detected by the first reference current density and the first threshold voltage, and the drainage malfunction can be detected by the second reference current density and the second threshold voltage.

Electric power generated upon the inspection of presences/absences of the catalytic layer deterioration and the drainage malfunction should not be wasted. Thus, an output terminal of the current regulator may be connected to a battery. Further, the controller may be configured to reduce remaining electric energy in the battery to less than 50% prior to regulating the output current density to the first reference current density and the second reference current density. The electric power outputted by the current regulator upon the inspection can be stored in the battery.

The catalytic layer deterioration and the drainage malfunction can also be distinguished by using a voltage regulator instead of the current regulator. In this case, the controller executes a following inspection process after having executed the drainage of the water from the fuel cell. The controller regulates a voltage of the fuel cell by using the voltage regulator. The controller acquires an output current density of the fuel cell (first output current density) when the fuel cell outputs the output voltage equal to the first reference voltage and an output current density of the fuel cell (second output current density) when the fuel cell outputs the output voltage equal to the second reference voltage. The controller outputs a first determination signal when the first output current density is lower than the first threshold current density and the second output current density is higher than the second threshold current density, the first determination signal indicating that the catalytic layer is deteriorated and the drainage is executed without malfunction. The controller outputs a second determination signal when the first output current density is higher than the first threshold current density and the second output current density is lower than the second threshold current density, the second determination signal indicating that the catalytic layer is not deteriorated and the drainage is executed with malfunction. The controller outputs a third determination signal when the first output current density is lower than the first threshold current density and the second output current density is lower than the second threshold current density, the third determination signal indicating that the catalytic layer is deteriorated and the drainage is executed with malfunction.

The fuel cell system disclosed herein may be suitable to be mounted in an electric vehicle. The fuel cell system disclosed herein may detect the catalytic layer deterioration and the drainage malfunction in a state of being mounted in an electric vehicle.

Details and further improvements of the technique disclosed herein will be described in Detailed Description below.

BRIEF DESCRIPTION OF DRAWINGS

FIG. 2 is an I-V graph showing a voltage drop caused by catalytic layer deterioration and a voltage drop caused by drainage malfunction.

DETAILED DESCRIPTION

Figure 1:
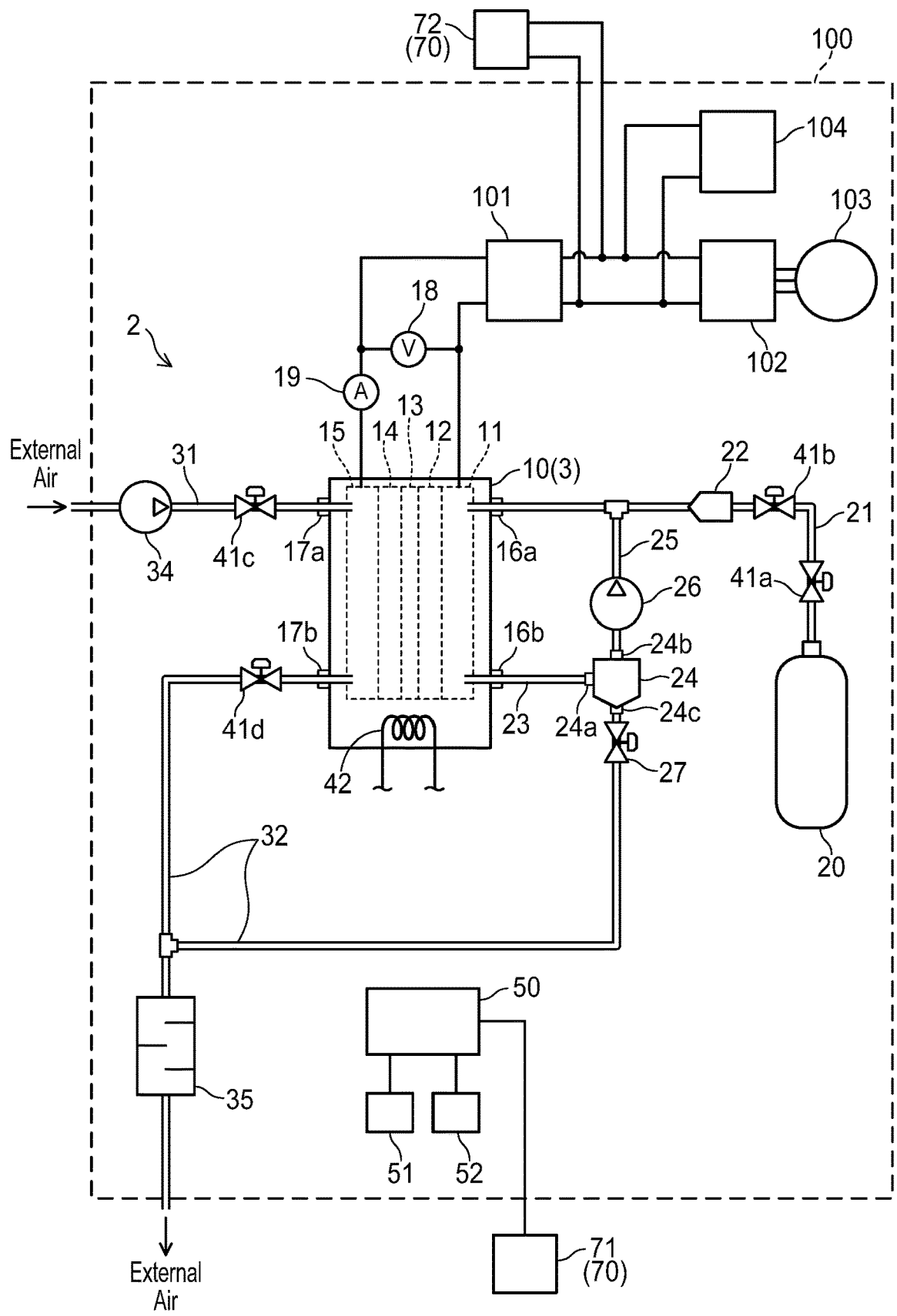
FIG. 1 is a block diagram of an electric vehicle including a fuel cell system of an embodiment.

A fuel cell system 2 of an embodiment will be described with reference to the drawings. The fuel cell system 2 is mounted in an electric vehicle 100. FIG. 1 shows a block diagram of the electric vehicle 100 including the fuel cell system 2. The electric vehicle 100 is configured to travel using an electric motor 103 by obtaining electric power from the fuel cell system 2. Output electric power of the fuel cell system 2 is stepped up by a step-up converter 101, thereafter converted to AC power in an inverter 102, and supplied to the traction electric motor 103. A battery 104 is connected to an output terminal of the step-up converter 101 in parallel with the inverter 102. Of the electric power generated by the fuel cell system 2, electric power that was not consumed by the electric motor 103 is charged in the battery 104.

The fuel cell system 2 includes a fuel cell 10 (fuel cell stack 3) and a fuel tank 20. The fuel cell stack 3 is a structure in which multiple fuel cells are stacked and electrically connected in series (or in parallel). The fuel cell system 2 includes the fuel cell stack 3 that includes multiple fuel cells. However, since the present embodiment focuses on one fuel cell 10, thus FIG. 1 depicts only one fuel cell 10. Although the fuel cell stack 3 is connected to the step-up converter 101 in actuality, depiction of the fuel cell stack 3 is omitted in FIG. 1 for convenience of explanation.

The fuel cell 10 includes an anode diffusion layer 11, an anode catalytic layer 12, an electrolyte film 13, a cathode catalytic layer 14, and a cathode diffusion layer 15. The anode catalytic layer 12 and the cathode catalytic layer 14 face each other across the electrolyte film 13. The anode diffusion layer 11 is positioned outward of the anode catalytic layer 12 (on an opposite side from the electrolyte film 13). The cathode diffusion layer 15 is positioned outward of the cathode catalytic layer 14 (on an opposite side from the electrolyte film 13).

Fuel gas is supplied to the anode diffusion layer 11 through an anode gas inlet 16a. Air is supplied to the cathode diffusion layer 15 through a cathode gas inlet 17a. The fuel gas (hydrogen gas) and oxygen in the air chemically react with each other, by which current is obtained. Water is generated by this chemical reaction. Since the chemical reaction in the fuel cell 10 is well known, detailed description thereof will be omitted.

The fuel gas that was not used in the chemical reaction and impurities generated in the chemical reaction (including the water) are discharged from an anode gas outlet 16b. Gas discharged from the anode gas outlet 16b may be termed off gas. The generated water and the air (oxygen) that was not used are discharged from a cathode gas outlet 17b. A part of the water is discharged also from the anode gas outlet 16b.

Equipment on a fuel gas side of the fuel cell system 2 will be described. As the equipment for feeding the fuel gas to an anode side of the fuel cell 10, the fuel cell system 2 includes a fuel supply pipe 21, an injector 22, an off gas exhaust pipe 23, a gas-liquid separator 24, a return pipe 25, a pump 26, and a gas and water discharge valve 27.

The fuel supply pipe 21 connects the fuel tank 20 with the fuel cell 10. Two valves 41a, 41b and the injector 22 are connected to the fuel supply pipe 21. The valve 41a is a main stop valve and is configured to stop discharge of the fuel gas from the fuel tank 20 while the fuel cell system 2 is not operating. The valve 41b is a regulator valve and is configured to regulate a pressure of the fuel gas supplied to the injector 22. The injector 22 is configured to increase the pressure of the fuel gas and supply the same to the fuel cell 10.

One end of the fuel supply pipe 21 is connected to the anode gas inlet 16a of the fuel cell 10 and is configured to supply the fuel gas to the anode diffusion layer 11 of the fuel cell 10. One end of the off gas exhaust pipe 23 is connected to the anode gas outlet 16b, and another end of the off gas exhaust pipe 23 is connected to a gas inlet 24a of the gas-liquid separator 24.

The gas-liquid separator 24 is configured to separate the off gas discharged from the anode gas outlet 16b into hydrogen gas (residual fuel gas) and impurities. Typical examples of the impurities separated from the off gas in the gas-liquid separator 24 are nitrogen gas and water. Nitrogen contained in the air supplied to a cathode side reaches the anode side by passing through the electrolyte film 13, which result in the nitrogen gas. The residual fuel gas is discharged from a gas outlet 24b and the impurities are discharged from an impurity discharging outlet 24c.

One end of the return pipe 25 is connected to the gas outlet 24b of the gas-liquid separator 24, and another end of the return pipe 25 is connected to the fuel supply pipe 21. The pump 26 is mounted on the return pipe 25. The pump 26 is configured to pump out the residual fuel gas separated from the off gas in the gas-liquid separator 24 into the fuel supply pipe 21. The gas and water discharge valve 27 is connected to the impurity discharging outlet 24c of the gas-liquid separator 24. An exhaust pipe 32 is connected to an outlet of the gas and water discharge valve 27. When the gas and water discharge valve 27 opens, the impurities separated from the off gas in the gas-liquid separator 24 are discharged into the exhaust pipe 32.

When the fuel cell 10 continues to generate power, the impurities accumulate in the gas-liquid separator 24. The impurities are mostly water and nitrogen gas. The controller 40 opens the gas and water discharge valve 27 while power is generated in the fuel cell 10, and discharges the impurities to the external air through the exhaust pipe 32. When a malfunction such as a clog occurs in a drainage pathway from the fuel cell 10 to an outlet of the exhaust pipe 32 and a large amount of water accumulates in the fuel cell 10, a gas flow therein is obstructed, and performance of the fuel cell 10 is thereby deteriorated. The deterioration of the power-generation performance due to the water accumulation in the fuel cell 10 is called flooding. In the disclosure herein, "flooding" and "drainage malfunction" are used to mean the same.

Equipment on an air-supply side of the fuel cell system 2 will be described. As the equipment for supplying air (oxygen) to the cathode side of the fuel cell 10, the fuel cell system 2 includes an air supply pipe 31, an air compressor 34, and valves 41c, 41d.

One end of the air supply pipe 31 is connected to the cathode gas inlet 17a of the fuel cell 10 and another end thereof is opened to the external air. The air compressor 34 and the valve 41c are mounted on the air supply pipe 31. The air compressor 34 is configured to compress the external air and supply the air to the fuel cell 10 (cathode diffusion layer 15) through the air supply pipe 31. The exhaust pipe 32 is connected to the cathode gas outlet 17b of the fuel cell 10. The valve 41d is mounted on the exhaust pipe 32. The valve 41c and the valve 41d are regulator valves, which are configured to regulate a pressure of the air supplied to the fuel cell 10 (cathode diffusion layer 15).

The exhaust pipe 32 is connected to the outlet of the gas and water discharge valve 27 and the cathode gas outlet 17b. Exhausted air discharged from the cathode gas outlet 17b of the fuel cell 10 and the impurity gas discharged from the outlet of the gas and water discharge valve 27 are mixed in the exhaust pipe 32 and the mixture thereof is discharged from the exhaust pipe 32 to the external air. A muffler 35 is connected to a downstream portion of the exhaust pipe 32. The exhausted gas (mixture gas of the exhausted air and the impurity gas) is discharged to the external air through the muffler 35. The water accumulated in the fuel cell 10 is also discharged outside the vehicle through the exhaust pipe 32 and the muffler 35.

The fuel cell system 2 includes pressure sensor(s), concentration sensor(s), and/or flow rate sensor(s) at various positions. Further, a humidifier may be mounted on the air supply pipe 31. Moisture can be added to the supplied air by the humidifier. Adding the moisture to the supplied air can prevent dry-out of the fuel cell 10.

The step-up converter 101 is connected to an electrode of the fuel cell 10. As aforementioned, the electric power generated by the fuel cell 10 (fuel cell system 2) is stepped up by the step-up converter 101 and supplied to the inverter 102 or the main battery 104. As aforementioned, the fuel cell system 2 in actuality includes the fuel cell stack 3 in which multiple fuel cells are stacked, and this fuel cell stack 3 is connected to the step-up converter 101.

The fuel cell system 2 further includes a heater 42 configured to heat the fuel cell 10. The performance of the fuel cell 10 decreases at low temperatures. When the temperature of the fuel cell 10 is low, the controller 50 operates the heater 42 and heats the fuel cell 10. The heater 42 may be of a type that directly heats the fuel cell 10 by electricity or of a type that heats the fuel cell 10 by a heating medium that has been heated.

The controller 50 controls the injector 22, the pump 26, the valves 41a to 41e, the gas and water discharge valve 27, the air compressor 34, the step-up converter 101, the inverter 102, and the heater 42. The devices such as the injector 22 are connected to the controller 50 by signal lines, however, depiction of the signal lines is omitted in FIG. 1.

The performance of the fuel cell 10 decreases when the catalytic layer (anode catalytic layer 12 and cathode catalytic layer 14) deteriorates. The performance of the fuel cell 10 decreases also by the drainage malfunction. The water accumulated in the fuel cell 10 would normally be drained outside the vehicle through the exhaust pipe 32 and the muffler 35. Further, the water remaining in the fuel cell 10 may be drained when an internal pressure of the fuel cell 10 is set to its maximum. However, drainage malfunction may occur in the fuel cell 10 due to a clog and the like in the gas pathway in the fuel cell 10. The fuel cell system 2 is configured to detect both the catalytic layer deterioration and the drainage malfunction with a distinction between them.

An inspection process of detecting the catalytic layer deterioration and the drainage malfunction is executed with an inspection device 70 connected to the electric vehicle 100. The inspection device 70 is configured of a computer 71 and an auxiliary battery 72. The computer 71 is connected to the controller 50, and the auxiliary battery 72 is connected to the battery 104 in parallel. The inspection process is executed in a service station in a state where the electric vehicle 100 is not operating. The inspection process will be described later.

The fuel cell system 2 includes a voltage sensor 18 and a current sensor 19 used in the inspection process. The voltage sensor 18 is configured to measure a voltage (output voltage) of the fuel cell 10. The current sensor 19 is configured to measure output current of the fuel cell 10. Since a cross-sectional area of an output cable of the fuel cell 10 is known, an output current density of the fuel cell 10 can be obtained from the measured value of the current sensor 19. FIG. 1 depicts the voltage sensor 18 and the current sensor 19 between the fuel cell 10 and the step-up converter 101 for convenience of explanation. However, it should be noted that the voltage sensor 18 and the current sensor 19 are configured to measure the voltage and the output current density of each fuel cell 10, rather than measuring current supplied to the step-up converter 101 and a voltage applied thereto.

An art for detecting the catalytic layer deterioration and the drainage malfunction with a distinction between them will be described. When the catalytic layer deteriorates, the voltage drops over an entire range of the output current density of the fuel cell. On the other hand, even when the drainage malfunction occurs and a large amount of water accumulates in the fuel cell, the voltage does not drop so much while the output current density is small. This is because since only a small amount of fuel gas is supplied when the output current density is small, the fuel gas can still flow despite water accumulation in the fuel cell. On the other hand, when the output current density is large, the voltage drops when the drainage malfunction is occurring. This is because the gas flow is obstructed by the drainage malfunction at a greater degree with a larger amount of the fuel gas (and oxygen). "Voltage drop" refers to the voltage decreasing below an output voltage expected in a healthy fuel cell.

A phenomenon as above is shown in FIG. 2. FIG. 2 is a graph called an I-V curve in the technical field of fuel cells. A horizontal axis indicates the output current density of the fuel cell and a vertical axis indicates the voltage of the fuel cell. A solid line graph G1 indicates an I-V curve of a healthy fuel cell. A dotted line graph G2 indicates an I-V curve of a fuel cell with a deteriorated catalytic layer (without drainage malfunction). A one-dot chain line graph G3 indicates an I-V curve of a fuel cell with drainage malfunction (without catalytic layer deterioration).

In comparing the healthy fuel cell (graph G1) and the fuel cell with the catalytic layer deterioration (graph G2), their voltage drops are substantially constant over their entire output current density. On the other hand, in comparing the healthy fuel cell (graph G1) and the fuel cell with the drainage malfunction (graph G3), the voltage drop in the graph G3 becomes greater as the output current density increases. A voltage of a fuel cell with both the catalytic layer deterioration and the drainage malfunction drops further than that of the graph G3.

When the output of the fuel cell is at a current density A1, a voltage Vc1 of the fuel cell with the catalytic layer deterioration (graph G2) is lower than a voltage Vd1 of the fuel cell with the drainage malfunction (graph G3). On the other hand, when the output of the fuel cell is at a current density A2 (>A1), a voltage Vd2 of the fuel cell with the drainage malfunction (graph G3) is lower than a voltage Vc2 of the fuel cell with the catalytic layer deterioration (graph G2). Here, a first threshold voltage Vth1 is set between the voltage Vd1 and the voltage Vc1, and a second threshold voltage Vth2 is set between the voltage Vd2 and the voltage Vc2. It can be determined that catalytic layer deterioration is not occurring if the voltage of the fuel cell is greater than the first threshold voltage Vth1 when the output of the fuel cell is regulated to be at the first reference current density A1. It can be determined that catalytic layer deterioration is occurring if the voltage of the fuel cell is smaller than the first threshold voltage Vth1 when the output of the fuel cell is regulated to be at the first reference current density A1.

It can be determined that drainage malfunction is not occurring if the voltage of the fuel cell is greater than the second threshold voltage Vth2 when the output of the fuel cell is regulated to be at the second reference current density A2 (>A1). It can be determined that drainage malfunction is occurring if the voltage of the fuel cell is smaller than the second threshold voltage Vth2 when the output of the fuel cell is regulated to be at the second reference current density A2.

In a range in which the output current density of the fuel cell is about less than 10% of its maximum output current density, the voltage of the fuel cell in which the catalytic layer deterioration is occurring (graph G2) is always lower than the voltage of the fuel cell in which the drainage malfunction is occurring (graph G3). In a range in which the output current density of the fuel cell exceeding about 40% of its maximum output current density, the voltage of the fuel cell in which the drainage malfunction is occurring (graph G3) is always lower than the voltage of the fuel cell in which the catalytic layer deterioration is occurring (graph G2). Due to this, the first reference current density A1 is selected from a range that is less than 10% of the maximum current density of the fuel cell, and the second reference current density A2 is selected from a range that exceeds 40% of the maximum current density.

The first reference current density A1, the second reference current density A2, the first threshold voltage Vth1, and the second threshold voltage Vth2 are dependent on performance of each fuel cell. Further, the catalytic layer deterioration progresses gradually, and the voltage drop also progresses gradually. A case in which the voltage of the fuel cell is smaller than the first threshold voltage Vth1 when the output of the fuel cell is regulated to be at the first reference current density A1 means that the catalytic layer deterioration has progressed to a point where replacement of the fuel cell is necessary. Similarly, a case in which the voltage of the fuel cell is smaller than the second threshold voltage Vth2 when the output of the fuel cell is regulated to be at the second reference current density A2 means that the drainage malfunction has progressed to a point where the replacement of the fuel cell is necessary.

The inspection process based on the above logic (inspection process for detecting catalytic layer deterioration and drainage malfunction in a fuel cell) is incorporated into the controller 50. The inspection process will be described with reference to flowcharts of FIGS. 3 and 4.

The inspection process is executed in a state where the electric vehicle 100 is not operating. During the inspection process, the inverter 102 and the electric motor 103 are stopped. Further, as aforementioned, the inspection process is executed with the inspection device 70 connected to the electric vehicle 100. The computer 71 of the inspection device 70 is connected to the controller 50 and the auxiliary battery 72 is connected to the battery 104. When the auxiliary battery 72 is connected, electric power from the battery 104 flows to the auxiliary battery 72, and a remaining electric energy (State Of Charge: SOC) of the battery 104 is reduced to less than 50%.

Figure 3:
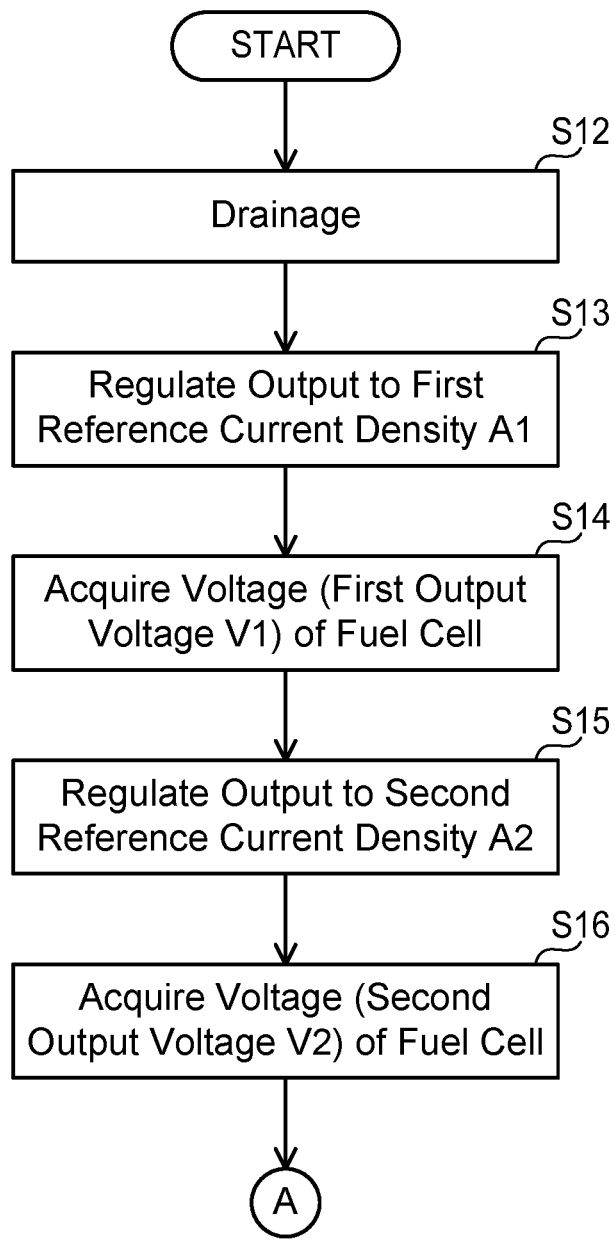
FIG. 3 is a flowchart of a fuel cell inspection process.
Figure 4:
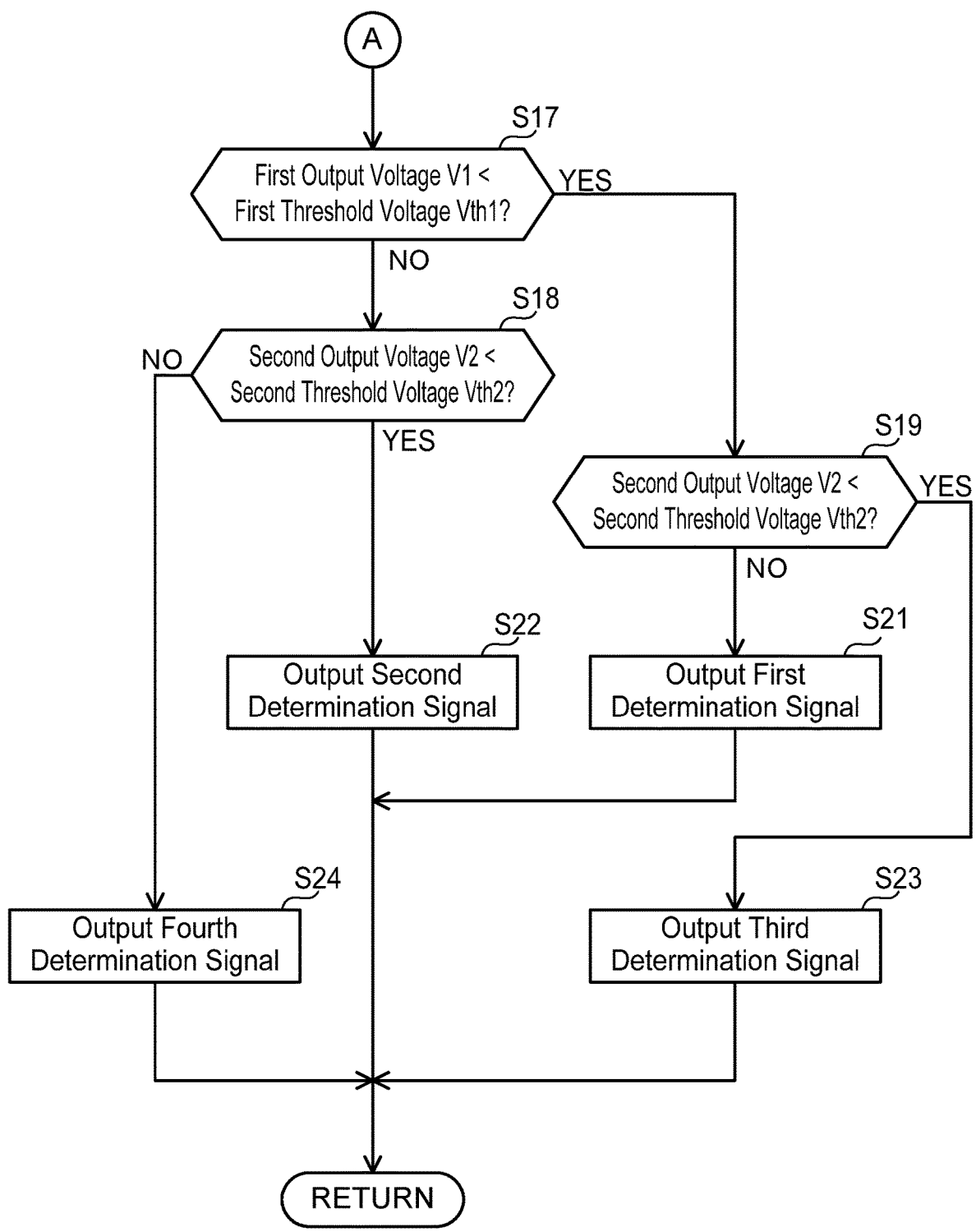
FIG. 4 is a flowchart of the fuel cell inspection process (continuation of FIG. 3).

Processes of FIGS. 3 and 4 are initiated when the computer 71 of the inspection device 70 sends an instruction to execute the inspection process to the controller 50. The controller 50 firstly executes drainage (step S12). In the drainage, the controller 50 heats the fuel cell 10 to a temperature higher than a predetermined temperature (such as 70° C.) using the heater 42. The fuel cell 10 may be heated by a control method called a rapid startup operation instead of using the heater 42. The heater 42 may not be provided.

The water in the fuel cell 10 transforms to vapor by the heating, and is smoothly drained. Heating the fuel cell 10 is useful in effectively draining the fuel cell 10. Then, the controller 50 operates the air compressor 34 and the injector 22 at their maximum outputs. By driving the air compressor 34 at the maximum output, the internal pressure on the cathode side of the fuel cell 10 increases to the maximum pressure. Further, by driving the injector 22 at the maximum output, the internal pressure on the anode side of the fuel cell 10 also increases to the maximum pressure. By increasing the internal pressure in the fuel cell 10 to the maximum pressure, the water remaining in the fuel cell 10 is forced out.

When the fuel cell 10 is healthy, the water in the fuel cell 10 is suitably drained by the drainage of step S12. When the water is suitably drained from the fuel cell 10, the voltage drop (graph G3) shown in FIG. 2 does not occur. On the other hand, when a drainage pathway of the fuel cell 10 (or the drainage pathway such as the exhaust pipe 32) is clogged, the water is not fully drained from the fuel cell 10. When the drainage malfunction occurs, the voltage drop (graph G3) shown in FIG. 2 occurs. The drainage malfunction can be detected in processes from step S13.

The inspection process of the present embodiment determines that the drainage malfunction is occurring when the voltage drop of the graph G3 occurs despite heating of the fuel cell 10 and maximization of the internal pressure of the fuel cell 10. By heating the fuel cell 10 to a predetermined temperature or higher and evaporating the water in the fuel cell 10, relatively serious drainage malfunction can certainly be detected.

After the drainage, the controller 50 controls the step-up converter 101 to regulate the output of the fuel cell 10 to be at the first reference current density A1 (step S13). By setting an output voltage of the step-up converter 101 to be slightly higher than the voltage of the battery 104, the output of the fuel cell 10 is regulated to be at the first reference current density A1. In actuality, the fuel cell stack 3 is connected to the step-up converter 101, and a total of outputs of multiple fuel cells flows in the step-up converter 101. As aforementioned, the current sensor 19 is disposed in the fuel cell 10, and the output current density of the fuel cell 10 is acquired from the measured value of the current sensor 19. The controller 50 regulates the output of the fuel cell 10 to be at the first reference current density A1 by monitoring the measured value of the current sensor 19 and performing feedback control on the step-up converter 101.

The controller 50 acquires the voltage (first output voltage V1) of the fuel cell 10 when the output of the fuel cell 10 is at the first reference current density A1 (step S14). The voltage of the fuel cell 10 is measured by the voltage sensor 18.

Next, the controller 50 increases the output voltage of the step-up converter 101 and regulates the output of the fuel cell 10 to be at the second reference current density A2 (step S15). Then, the controller 50 acquires the voltage (second output voltage V2) of the fuel cell 10 when the output of the fuel cell 10 is at the second reference current density A2 (step S16).

The controller 50 compares the acquired first output voltage V1 with the first threshold voltage Vth1, and compares the second output voltage V2 with the second threshold voltage Vth2 (FIG. 4, steps S17, S18, S19).

When the first output voltage V1 is lower than the first threshold voltage Vth1 and the second output voltage V2 is higher than the second threshold voltage Vth2, the controller 50 outputs a first determination signal indicating that the catalytic layer is deteriorated and the drainage is executed without malfunction (step S17: YES, step S19: NO, step S21).

When the first output voltage V1 is higher than the first threshold voltage Vth1 and the second output voltage V2 is lower than the second threshold voltage Vth2, the controller 50 outputs a second determination signal indicating that the catalytic layer is not deteriorated and the drainage is executed with malfunction (step S17: NO, step S18: YES, step S22).

When the first output voltage V1 is lower than the first threshold voltage Vth1 and the second output voltage V2 is lower than the second threshold voltage Vth2, the controller 50 outputs a third determination signal indicating that the catalytic layer is deteriorated and the drainage is executed with malfunction (step S17: YES, step S19: YES, step S23).

When the first output voltage V1 is higher than the first threshold voltage Vth1 and the second output voltage V2 is higher than the second threshold voltage Vth2, the controller 50 outputs a fourth determination signal indicating that the catalytic layer is not deteriorated and the drainage is executed without malfunction (step S17: NO, step S18: NO, step S24).

Outputted one of the first, second, third, and fourth determination signals is sent to the computer 71 of the inspection device 70. The computer 71 displays a message corresponding to the received determination signal. A staff operating the inspection device 70 can acknowledge a state of the fuel cell 10 from this display on the computer 71.

By the inspection process of FIGS. 3 and 4, the fuel cell system 2 can detect both the catalytic layer deterioration and the malfunction in the drainage from the fuel cell 10 with distinction between them.

Some notes related to the art described in the embodiment will be given. The fuel cell system may include a plurality of fuel cells and sensors for measuring an output current density and a voltage of each fuel cell. Catalytic layer deterioration and drainage malfunction in each of the fuel cells can be detected.

The fuel cell system may include a sensor configured to measure a total output current density and a total voltage of the plurality of fuel cells electrically connected to each other. Catalytic layer deterioration and drainage malfunction in one or more of the plurality of fuel cells electrically connected to each other can be detected.

In the fuel cell system 2 of the embodiment, the current density of the output of the fuel cell 10 is regulated by the step-up converter 101 regulating the output voltage. The step-up converter 101 corresponds to an example of a current regulator. A device for regulating the current density of the output of the fuel cell 10 is not limited to the step-up converter.

The inspection process of the embodiment is executed by connecting the inspection device 70 to the fuel cell system 2 in the electric vehicle 100. The inspection process may be executed solely by the fuel cell system without requiring an additional device. In this case, the controller 50 outputs the determination signal to an on-board diagnostic memory or an instrumental panel. The instrumental panel having received the determination signal displays a message corresponding to the received determination signal. Alternatively, the diagnostic memory having received the determination signal stores the message corresponding to the received determination signal.

In the fuel cell system 2 of the embodiment, the controller 50 stores the first threshold voltage corresponding to the first reference current density and the second threshold voltage corresponding to the second reference current density that is greater than the first reference current density. The controller 50 acquires the voltage (first output voltage) of the fuel cell when the output current density of the fuel cell 10 is the first reference current density and the voltage (second output voltage) of the fuel cell when the output current density of the fuel cell 10 is the second reference current density. The controller 50 compares the first output voltage with the first threshold voltage to determine presence/absence of the catalytic layer deterioration, and compares the second output voltage with the second threshold voltage to determine presence/absence of the drainage malfunction.

The similar inspection can be executed by using the voltage as the reference instead of using the output current density as the reference. In this case, the controller 50 stores a first threshold current density corresponding to a first reference voltage and a second threshold current density corresponding to a second reference voltage that is greater than the first reference voltage. The controller 50 executes the drainage of draining the water from the fuel cell 10, and acquires the output current density (first output current density) of the fuel cell 10 when the voltage of the fuel cell 10 is the first reference voltage and the output current density (second output current density) of the fuel cell 10 when the voltage of the fuel cell 10 is the second reference voltage. The controller 50 compares the first output current density with the first threshold current density to determine the presence/absence of the catalytic layer deterioration. The controller 50 compares the second output current density with the second threshold current density to determine the presence/absence of the drainage malfunction.

When the fuel cell system is mounted in the electric vehicle, deterioration of the fuel cell may be detected by the following process. The controller of the fuel cell system stores a map of the fuel cell voltage (expected voltage in healthy and aged fuel cell) over mileage of the electric vehicle. When an average voltage of the plurality of fuel cells included in the fuel cell stack becomes lower than the expected voltage in the map, the controller determines that an entirety of the fuel cell stack is deteriorated. The controller measures the voltage of each fuel cell and compares the voltage of a specific fuel cell with the average voltage. The controller determines that the specific fuel cell is deteriorated when a difference between the voltage of the specific fuel cell and the average voltage is greater than a predetermined allowable voltage difference.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A fuel cell system comprising:
   a fuel cell in which an electrolyte film is held between a catalytic layer and a diffusion layer;
   a current regulator configured to regulate an output current density of the fuel cell;
   a voltage sensor configured to measure an output voltage of the fuel cell; and
   a controller storing a first threshold voltage that corresponds to a first reference current density and a second threshold voltage that corresponds to a second reference current density, the second reference current density being greater than the first reference current density,
   wherein the controller is configured to:
      execute drainage of water from the fuel cell;
      acquire a first output voltage of the fuel cell when the fuel cell outputs current having the first reference current density and a second output voltage of the fuel cell when the fuel cell outputs current having the second reference current density;
      output a first determination signal when the first output voltage is lower than the first threshold voltage and the second output voltage is higher than the second threshold voltage, the first determination signal indicating that the catalytic layer is deteriorated and the drainage is executed without trouble;
      output a second determination signal when the first output voltage is higher than the first threshold voltage and the second output voltage is lower than the second threshold voltage, the second determination signal indicating that the catalytic layer is not deteriorated and the drainage is executed with malfunction; and
      output a third determination signal when the first output voltage is lower than the first threshold voltage and the second output voltage is lower than the second threshold voltage, the third determination signal indicating that the catalytic layer is deteriorated and the drainage is executed with malfunction.

2. The fuel cell system of claim 1, wherein the controller operates both an air compressor and an injector at their maximum outputs in the drainage, the air compressor being configured to supply air to the fuel cell, and the injector being configured to supply fuel gas to the fuel cell.

3. The fuel cell system of claim 1, wherein the controller maximizes an internal pressure of the fuel cell in the drainage.

4. The fuel cell system of claim 1, wherein
   the first reference current density is less than 10% of a maximum output current density of the fuel cell, and
   the second reference current density is greater than 40% of the maximum output current density of the fuel cell.

5. The fuel cell system of claim 1, wherein
   the first threshold voltage is:
      lower than the output voltage of the fuel cell when the fuel cell in which the drainage is executed with malfunction outputs current having the first reference current density; and
      higher than the output voltage of the fuel cell when the fuel cell in which the catalytic layer is deteriorated outputs current having the first reference current density, and
   the second threshold voltage is:
      lower than the output voltage of the fuel cell when the fuel cell in which the catalytic layer is deteriorated outputs current having the second reference current density; and
      higher than the output voltage of the fuel cell when the fuel cell in which the drainage is executed with malfunction outputs current having the second reference current density.

6. The fuel cell system of claim 1, wherein
   an output terminal of the current regulator is connected to a battery, and
   the controller is configured to reduce remaining electric energy in the battery to less than 50% prior to regulating the output current density to the first reference current density and the second reference current density.

7. A fuel cell system comprising:
   a fuel cell in which an electrolyte film is held between a catalytic layer and a diffusion layer;
   a voltage regulator configured to regulate an output voltage of the fuel cell;
   a current sensor configured to measure an output current density of the fuel cell; and
   a controller storing a first threshold current density that corresponds to a first reference voltage and a second threshold current density that corresponds to a second reference voltage, the second reference voltage being greater than the first reference voltage, wherein the controller is configured to:
  execute drainage of water from the fuel cell;
  acquire a first output current density of the fuel cell when the fuel cell outputs the output voltage equal to the first reference voltage and a second output current density of the fuel cell when the fuel cell outputs the output voltage equal to the second reference voltage;
  output a first determination signal when the first output current density is lower than the first threshold current density and the second output current density is higher than the second threshold current density, the first determination signal indicating that the catalytic layer is deteriorated and the drainage is executed without malfunction;
  output a second determination signal when the first output current density is higher than the first threshold current density and the second output current density is lower than the second threshold current density, the second determination signal indicating that the catalytic layer is not deteriorated and the drainage is executed with malfunction; and
  output a third determination signal when the first output current density is lower than the first threshold current density and the second output current density is lower than the second threshold current density, the third determination signal indicating that the catalytic layer is deteriorated and the drainage is executed with malfunction.

* * * * *